US012757264B2

United States Patent
(12) United States Patent
Kuravangi-Thammaiah et al.
(10) Patent No.: US 12,757,264 B2
(45) Date of Patent: Oct. 6, 2026

(54) SYSTEMS AND METHODS FOR SECURE ROAMING NETWORK STEERING

(71) Applicant: Verizon Patent and Licensing Inc., Basking Ridge, NJ (US)

(72) Inventors: Shanthala Kuravangi-Thammaiah, Keller, TX (US); Jignesh Patel, Haltom City, TX (US); Vinod Kumar Choyi, Conshohocken, PA (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 385 days.

(21) Appl. No.: 18/347,021

(22) Filed: Jul. 5, 2023

(65) Prior Publication Data

US 2025/0016854 A1 Jan. 9, 2025

(51) Int. Cl.
*H04W 76/11* (2018.01)
*H04W 76/15* (2018.01)

(52) U.S. Cl.
CPC ............ *H04W 76/11* (2018.02); *H04W 76/15* (2018.02)

(58) Field of Classification Search
CPC ... H04W 76/11; H04W 76/15; H04W 12/062; H04W 12/009; H04W 28/16; H04W 28/18; H04W 28/20; H04W 28/22; H04W 28/26
See application file for complete search history.

(56) References Cited

U.S. PATENT DOCUMENTS

2017/0332226 A1* 11/2017 Bharatia ............... H04W 76/10
2021/0250890 A1* 8/2021 Won ....................... H04W 60/04
2021/0368341 A1* 11/2021 Liao ....................... H04W 12/72
2022/0060901 A1* 2/2022 Rajendran ............. H04W 24/10
2022/0272621 A1* 8/2022 Takakura ................ H04W 8/22
2022/0312360 A1* 9/2022 Kuppelur .............. H04W 60/04
2023/0208823 A1* 6/2023 Nakarmi ............. H04W 12/069 455/411
2024/0056932 A1* 2/2024 Qiao ................... H04W 36/305
2025/0119968 A1* 4/2025 Kuge .................... H04W 76/19

OTHER PUBLICATIONS

Third Generation Partnership Project, "Technical Specification Group Services and System Aspects; Security Architecture and Procedures for 5G system (Release 17)," 3GPP TS 33.501 V17.7.0 (Sep. 2022).

* cited by examiner

*Primary Examiner* — Sudesh M. Patidar

(57) ABSTRACT

A system described herein may request, from a first network, access parameters associated with a User Equipment ("UE") and a second network. The first network may be, for example, a home network with respect to the UE and the second network may be a roaming network with respect to the UE. The system may receive, from the first network, the requested access parameters associated with the UE and the second network, which may include authentication information associated with the first network (e.g., as provided by an authentication system of the first network). The system may output the access parameters and the authentication information to the UE, which may verify the access parameters based on the authentication information, select one or more access parameters of the verified access parameters, and request a communication session establishment with the second network in accordance with the selected one or more access parameters.

20 Claims, 9 Drawing Sheets

SYSTEMS AND METHODS FOR SECURE ROAMING NETWORK STEERING

BACKGROUND

Wireless networks provide wireless connectivity to User Equipment ("UEs"), such as mobile telephones, tablets, Internet of Things ("IoT") devices, Machine-to-Machine ("M2M") devices, or the like. Different networks may be operated, owned, provided, etc. by different entities such as network operators, service providers, carriers, or the like. Respective UEs may be registered with particular networks. The particular network for which a given UE is registered may be referred to as a "home" network with respect to the UE. The UE may connect to wireless networks, other than the home network. These other networks may be referred to as "roaming" networks with respect to the UE. A roaming network may communicate with a home network of a UE to obtain authentication or authorization information, which may be used by the roaming network to determine whether to provide wireless access to the UE.

DETAILED DESCRIPTION OF EXAMPLE EMBODIMENTS

The following detailed description refers to the accompanying drawings. The same reference numbers in different drawings may identify the same or similar elements.

Embodiments described herein may provide for the secure providing of roaming access parameters to a UE when the UE connects to a roaming network. As discussed herein, the roaming access parameters may indicate network slices of the roaming network that the UE is authorized to access, types of traffic or services that the UE is authorized to send or receive via the roaming network, Data Network Names ("DNNs") or Access Point Names ("APNs") of the roaming network that the UE is authorized to access, and/or other suitable information. Additionally, in accordance with embodiments described herein, when receiving such roaming access parameters when connecting to the roaming network, the UE may receive such roaming access parameters in a secure manner, indicating that the roaming access parameters have been provided by and/or otherwise verified by the home network. As such, the risk of "person-in-the-middle" attacks or other tampering of the roaming access parameters may be reduced or eliminated. In some embodiments, the secure manner in which the UE may receive the roaming access parameters may include receiving one or more signed messages, authentication tokens, or other suitable authentication information as generated or provided by one or more elements of the home network with respect to the UE.

Figure 1:
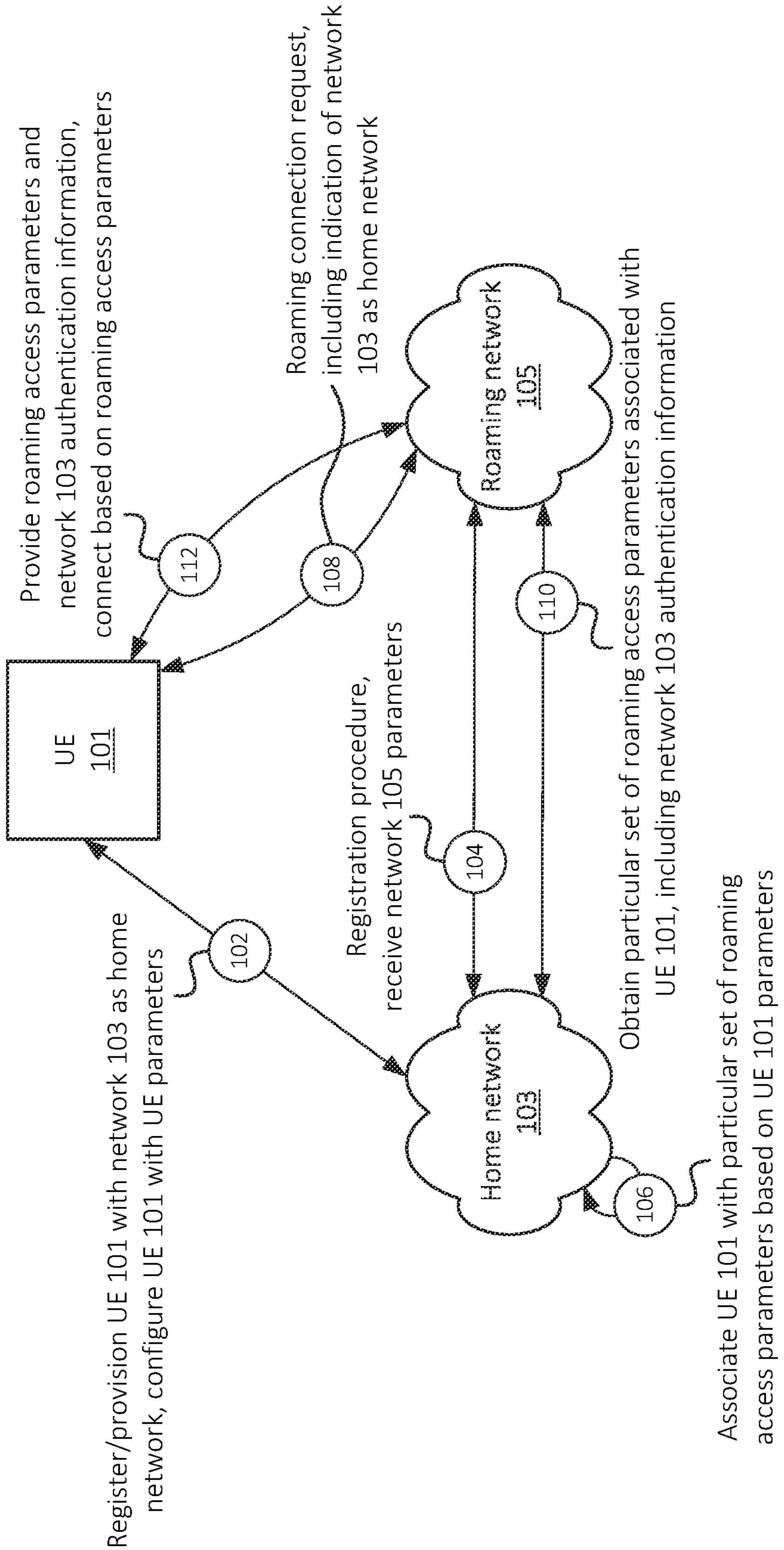
FIG. 1 illustrates an example overview of one or more embodiments described herein.

As shown in FIG. 1, UE 101 may be registered, provisioned, etc. (at 102) with network 103. As part of the registration, UE 101 may receive or maintain UE parameters, which may include information indicating that network 103 is a home network of UE 101. Such information may include a Public Land Mobile Network ("PLMN") identifier or other suitable identifier associated with network 103. The UE parameters may include additional information, such as Quality of Service ("QoS") information, access type information (e.g., radio access technologies ("RATs") or frequency bands of one or more RANs associated with network 103 that UE 101 is authorized to access), and/or other suitable information based on which UE 101 may communicate with network 103. Similarly, as part of the registration procedure, network 103 may assign, receive, maintain, etc. one or more identifiers associated with UE 101, such as an International Mobile Station Equipment Identity ("IMEI"), an International Mobile Subscriber Identity ("IMSI"), a Subscription Permanent Identifier ("SUPI"), a Globally Unique Temporary Identifier ("GUTI"), a Mobile Directory Number ("MDN"), and/or other some other type of UE identifier.

Network 103 may also perform or participate in a registration procedure (at 104) with another network 105. For example, networks 103 and 105 may be owned or operated by different entities, may be located in geographically distinct regions, may be associated with different PLMN identifiers (or other types of network identifiers), may maintain provisioning or registration information with distinct sets of UEs, and/or may otherwise be separate or distinct networks with respect to each other.

The registration (at 104) may include receiving parameters of network 105, such as network slices implemented by network 105, access parameters of network 105 (e.g., conditions or policies based on which certain UEs are authorized to access network 105 or particular slices of network 105), and/or other information associated with network 105. A network "slice" may refer to a logical or otherwise discrete set of network devices, functions, elements, etc. that provide differentiated service parameters (e.g., particular QoS parameters, Service Level Agreements ("SLAs"), minimum performance thresholds, etc.). For example, one network slice may provide relatively low latency and relatively high throughput, another network slice may provide relatively low latency and "best effort" throughput, another network slice may provide "best effort" latency and relatively high throughput, and so on. Different network slices may also provide differentiated security services, security assurances, security levels, etc. (e.g., by way of various cryptographic techniques, key lengths, and/or other suitable mechanisms). Different network slices may be associated with different Network Slice Selection Assistance Information ("NSSAI") values or other suitable identifiers.

In some embodiments, networks 103 and 105 may implement different network slices, may use different naming or identification schema for network slices, etc. In such situations, when receiving parameters of network 105, network 103 may map or otherwise associate network slices of network 105 with network slices of network 103. For example, network 103 may identify thresholds, SLAs, QoS parameters, etc. of network slices of network 105, and may identify "best fit" or otherwise corresponding network slices of network 103. For example, assume that network 103 implements a first network slice (referred to as "Slice_A" for this example) and a second network slice (referred to as "Slice_B"). Assume that Slice_A is associated with a relatively low latency threshold, and that Slice_B is associated with "best effort" latency performance. Further assume that network 103 receives information associated with a particular network slice implemented by network 105 (referred to as "Slice_1" for this example). Network 103 may identify which slice, out of Slice_A or Slice_B, most closely matches (e.g., using a suitable similarity analysis or other type of comparison) the parameters of Slice_1. Assume, for example, that Slice_1 is associated with a relatively low latency threshold. In such situations, network 103 may maintain information indicating that Slice_A, associated with network 103, is mapped to or otherwise corresponds to Slice_1 of network 105. In a similar manner, network 103 may map, correlate, associate, etc. some or all network slices (e.g., as indicated by network 105 during the registration procedure (at 104) with respective network slices implemented by network 103.

Network 103 may further associate (at 106) UE 101 with a particular set of roaming access parameters based on UE parameters associated with UE 101. For example, network 103 may identify that UE 101 is authorized to access Slice_A of network 103 (e.g., based on registration of UE 101 (at 102). Network 103 may further maintain (at 106) information indicating that UE 101 is authorized to access Slice_1 of network 105. For example, as noted above, Slice_1 may have been identified by network 103 as being a slice of network 105 that corresponds to Slice_A of network 103, which UE 101 is authorized to access. In some embodiments, network 103 and network 105 may further communicate, negotiate, etc. to indicate access permissions associated with particular UEs or groups of UEs. For example, network 105 may provide an indication that UE 101 is authorized to access Slice_1 of network 105, which may be based on a request for such access by network 103 and/or some other suitable device, system, or entity.

In some embodiments, network 103 may generate or maintain conditions, policies, etc. (e.g., UE Route Selection Policy ("URSP") rules or other suitable policies) that UE 101 may use to determine situations in which particular network slices should be requested. For example, one such URSP rule may indicate that UE 101 should request access to a particular slice of network 105 (e.g., Slice_1) for communication sessions associated with a gaming application, while UE 101 should request access to a different slice of network 105 for communication sessions associated with a video streaming application.

In some embodiments, network 103 may perform such association operations (at 106) based on receiving (at 104) network parameters associated with network 105. In some embodiments, network 103 may forgo performing such operations, associating UE 101 with network slices or other parameters of network 105, until a later time or based on one or more triggering events, such as receiving a roaming request from network 105 indicating that UE 101 is requesting a connection to network 105, as discussed below.

At some point, UE 101 may request (at 108) a connection to network 105, which may be based on UE 101 entering a coverage area of one or more RANs of network 105. For example, network 103 may provide wireless coverage in one region (e.g., in one country), while network 105 may provide wireless coverage in another region (e.g., in another country). In some situations, networks 103 and 105 may have partially or fully overlapping coverage areas, and UE 101 may request (at 108) the connection to network 105 based on a higher signal strength or signal quality with network 105 than network 103, and/or based on one or more other suitable factors. The connection request (at 108) may include an identifier of network 103 (e.g., a PLMN identifier or other suitable identifier), indicating that network 103 is a home network of UE 101.

As part of determining whether to provide wireless access to UE 101, and/or as part of determining parameters of such access, network 105 may communicate (at 110) with network 103, the home network of UE 101, in order to obtain roaming access parameters associated with UE 101. Such roaming access parameters may include, for example, an indication of whether UE 101 is authorized to access network 105. For example, UE 101 may, in some situations, not be associated with a subscription or permissions to access network 105 (e.g., network 105 itself may be on a blocked list of networks or may not be on an allowed list of networks, or UE 101 itself may not be authorized to access network 105 or other roaming networks). In such situations, network 103 may indicate to network 105 that UE 101 is not authorized to access network 105, and network 105 may deny the connection request.

Assuming however that UE 101 is authorized to access network 105, network 103 may provide (at 110) roaming access parameters associated with UE 101, such as one or more network slices of network 105 that UE 101 is authorized to access. Although the examples herein are provided in the context of indicating slices of network 105 that UE 101 is authorized to access, network 103 may perform other suitable operations (e.g., Steering of Roaming ("SoR") operations), such as indicating another network to which UE 101 should connect in lieu of network 105 (e.g., UE 101 may not be authorized to access network 105 but may be authorized to access some other network that is reachable by UE 101). Thus, in some embodiments, network 103 may provide (at 110) an indication of one or more network slices of network 105 that UE 101 is authorized to access. Additionally, or alternatively, network 103 may provide (at 110) an indication of one or more other networks that UE 101 is authorized to access (e.g., in addition to or in lieu of network 105).

In some embodiments, the roaming access parameters provided (at 110) to network 105 may include, may incorporate, may implement, etc. one or more authentication mechanisms used to indicate that network 103 has provided or has otherwise verified or approved the roaming access parameters. For example, when providing the roaming access parameters, network 103 may provide one or more authentication tokens, digital signatures, and/or other suitable information that may be used to verify that the roaming access parameters have been generated, signed, provided, etc. by network 103. Such authentication mechanisms may be used to avoid "person-in-the-middle" attacks, in which a malicious entity may modify or otherwise provide different parameters that have not been provided by network 103. Such attacks may result in service disruptions or other improper operation of network 105 and/or UE 101. Further, UE 101 may receive (at 112) the roaming access parameters, including the authentication information provided by network 103. Since the roaming access parameters include the authentication information associated with network 103, UE 101 may be able to verify that the received parameters are genuine or otherwise "trusted," and may proceed to connect to network 105 in accordance with such parameters. For example, UE 101 may request access to a particular network slice of network 105, as indicated by the network parameters. In this manner, UE 101 may be able to receive a similar level of service (e.g., similar QoS parameters) that were provided by network 103 when accessing network 105. For example, a low-latency gaming application that would be served by Slice_A of network 103 may be served by Slice_1 of network 105 when UE 101 connects to network 105.

In some embodiments, network 105 may also determine whether UE 101 is authorized to access the requested slice (e.g., where UE 101 requests a given slice based on the provided roaming access parameters). For example, network 105 may determine whether policies maintained by network 105 indicate that UE 101 is authorized to access the requested slice, may determine whether the requested slice is congested or overloaded (e.g., whether such slice has capacity or does not have capacity to serve UE 101), or the like. In the example of FIG. 1, assume that network 105 determines that UE 101 is authorized to access network 105 via the requested slice. UE 101 and network 105 may proceed to communicate (at 112) via the requested slice, which may include establishing one or more communication sessions (e.g., radio bearers, protocol data unit ("PDU") sessions, and/or other types of communication sessions) associated with the requested particular slice. For example, traffic sent between UE 101 and network 105 may include markings, identifiers, indicators, etc. associated with the particular slice, based on which one or more elements of network 105 may route such traffic via devices, systems, network functions, etc. that serve the particular slice.

Figure 2:
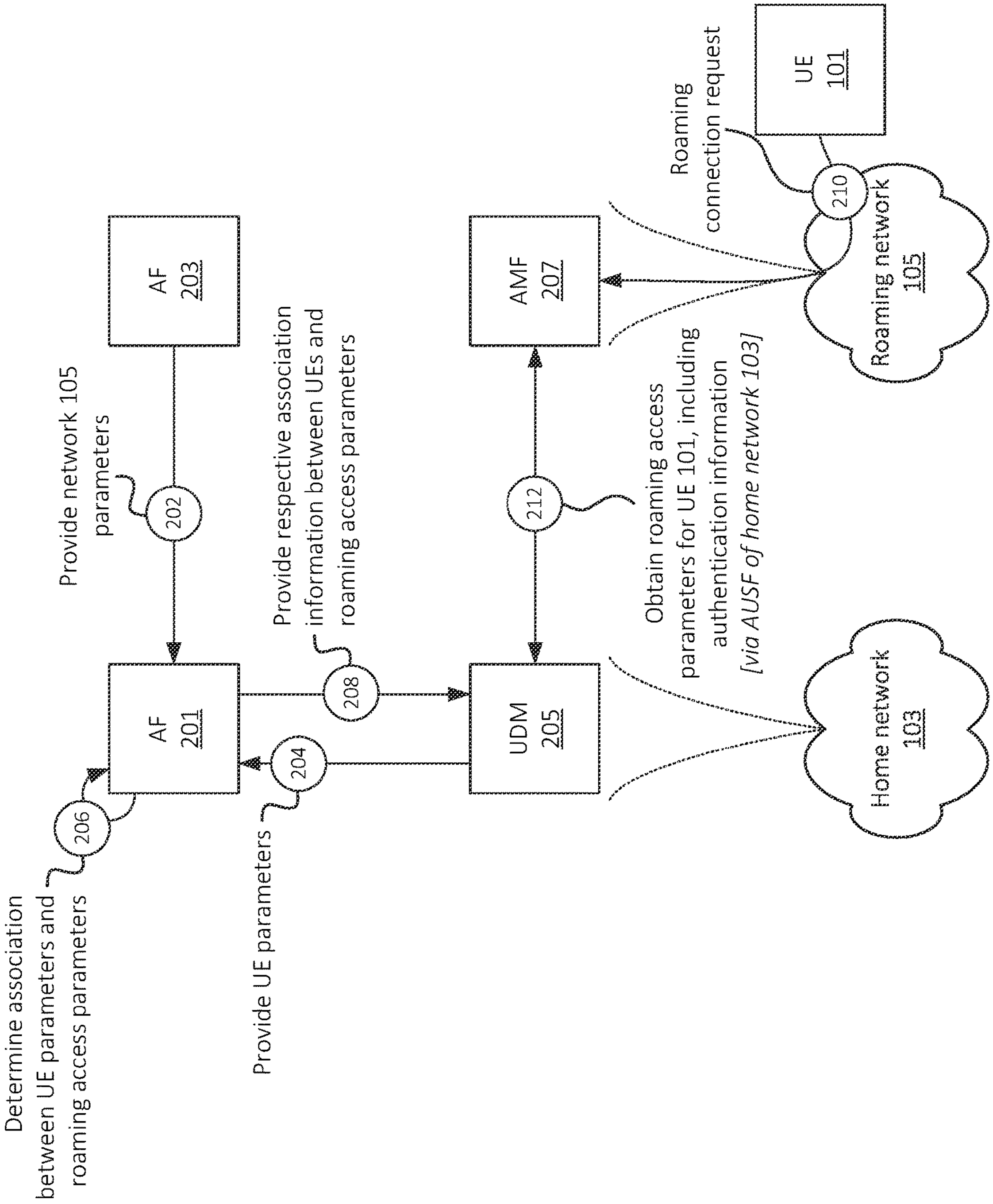
FIGS. 2-4 illustrate examples of providing roaming parameters, including home network authentication information, to a UE in order to facilitate communications between the UE and a roaming network, in accordance with some embodiments.

FIG. 2 illustrates operations that may be performed by particular elements of networks 103 and 105 to register networks 103 and 105 with each other and to provide roaming access parameters from network 103 to network 105. As shown, networks 103 and 105 may include or may be communicatively coupled to respective application functions ("AFs"). For example, network 103 may include or may be communicatively coupled to AF 201, and network 105 may include or may be communicatively coupled to AF 203. Although described in the context of separate AFs 201 and 203, in some embodiments, some or all of the operations described with respect to AFs 201 and 203 may be performed by a single AF or another type of suitable device or system. AFs 201 and 203 may communicate via an application programming interface ("API") or other suitable communication pathway.

As shown, AF 203 of network 105 may provide (at 202) parameters associated with network 105. As similarly discussed above, such parameters may include information associated with network slices, APNs, DNNs, etc. The parameters may indicate, for example, particular performance thresholds, QoS information, SLAs, etc. associated with particular network slices, APNs, etc. of network 105. Additionally, or alternatively, the parameters may include conditions, policies, rules, etc. associated with respective network slices, APNs, etc. For example, such conditions, policies, etc. may indicate particular UEs or groups of UEs (e.g., particular UE identifiers or groups of UE identifiers such as MDNs, IMEI values, etc.), categories or labels of UEs (e.g., "first responder," "enterprise," etc.), device types (e.g., IoT device, mobile phone, tablet, wearable device, etc.), and/or other suitable factors or attributes. For example, UEs associated with different factors, attributes, etc. may be associated with different sets of network slices, APNs, DNNs, etc.

As further shown, AF 201 may receive (at 204) UE parameters from a UE information repository of network 103, such as Unified Data Management function ("UDM") 205, a Unified Data Repository ("UDR"), an Unstructured Data Storage Function ("UDSF"), and/or some other suitable device or system. The UE parameters may include, for example, information indicating particular network slices, APNs, DNNs, etc. that particular UEs are authorized to access when communicating with network 103. Additionally, or alternatively, AF 201 may receive parameters associated with particular network slices of network 103, such as performance thresholds, QoS information, SLAs, etc. associated with particular network slices, APNs, etc. of network 103.

AF 201 may determine (at 206) an association between UE parameters, associated with one or more UEs (e.g., UEs for which network 103 is a home network) and roaming access parameters for network 105 (e.g., which may be applicable when UEs, for which network 103 is a home network, attempt to access network 105). As discussed above, such association may include determining particular network slices, APNs, DNNs, etc. of network 105 that correspond to network slices, APNs, DNNs, etc. of network 103. Further, for a given UE (e.g., UE 101), AF 201 may identify which network slices, APNs, etc. of network 105 such UE 101 is authorized to access (e.g., based on UE parameters received (at 204) from UDM 205). AF 201 may provide (at 208) association information to UDM 205, indicating particular network slices, APNs, etc. of network 105 that one or more UEs, such as UE 101, are authorized to access. In this manner, UDM 205 may maintain or obtain information associating multiple UEs, for which network 103 is a home network, with different network slices, APNs, etc. of one or more other networks (e.g., network 105 and/or other networks), inasmuch as such association indicates network slices, APNs, etc. of the one or more other networks that the UEs are authorized to access. In some embodiments, categories, classes, types, etc. of UEs (e.g., IoT devices, wearable devices, UEs in a "first responder" category, etc.) of network 103 may be authorized for particular network slices of network 105. In some embodiments, other rules, policies, etc. may be applied to indicate network slices of network 105 that UEs, for which network 103 is a home network, are authorized to access.

As noted above, one or more elements of network 103 and 105 (e.g., AFs 201 and 203 and/or one or more other elements) may communicate with each other to verify that the UEs of network 103 are authorized to access such slices, APNs, etc. of network 105 prior to providing (at 208) the association information to UDM 205. In some embodiments, such verification procedure may include registering UEs of network 103 with network 105, and/or network 105 may otherwise generate or maintain authentication and/or authorization information for UEs of network 103 that are authorized to access network 105.

As further shown, UE 101 may output (at 210) a roaming connection request to network 105. As similarly discussed above, network 105 may be a roaming network with respect to UE 101, and network 103 may be the home network of UE 101. For example, the roaming request may indicate that network 103 is the home network of UE 101. The roaming request may also include other suitable information, such as an identifier of UE 101 (e.g., an IMEI value, an MDN, a SUPI, etc.). An access management element of network 105, such as Access and Mobility Management Function ("AMF") 207, may receive the connection request (e.g., via an N1 interface, via Non-Access Stratum ("NAS") signaling, etc.) and may identify that the connection request is a roaming connection request. For example, the connection request may indicate that the connection request is a roaming connection request, and/or may include an identifier of network 103 as a home network associated with UE 101. As noted above, AMF 207 may verify that UE 101 is authorized to access network 105, where such access may have been authorized based on a previous registration procedure performed with respect to network 103 and/or UE 101 (e.g., in which network 105 maintains information indicating that UE 101 is authorized to access network 105). AMF 207 may, in some embodiments, perform an authorization check after the UE has been authenticated using 5G-AKA or EAP-AKA' procedures using subscriber credentials associated with UE 101 and home network 103.

Figure 3:
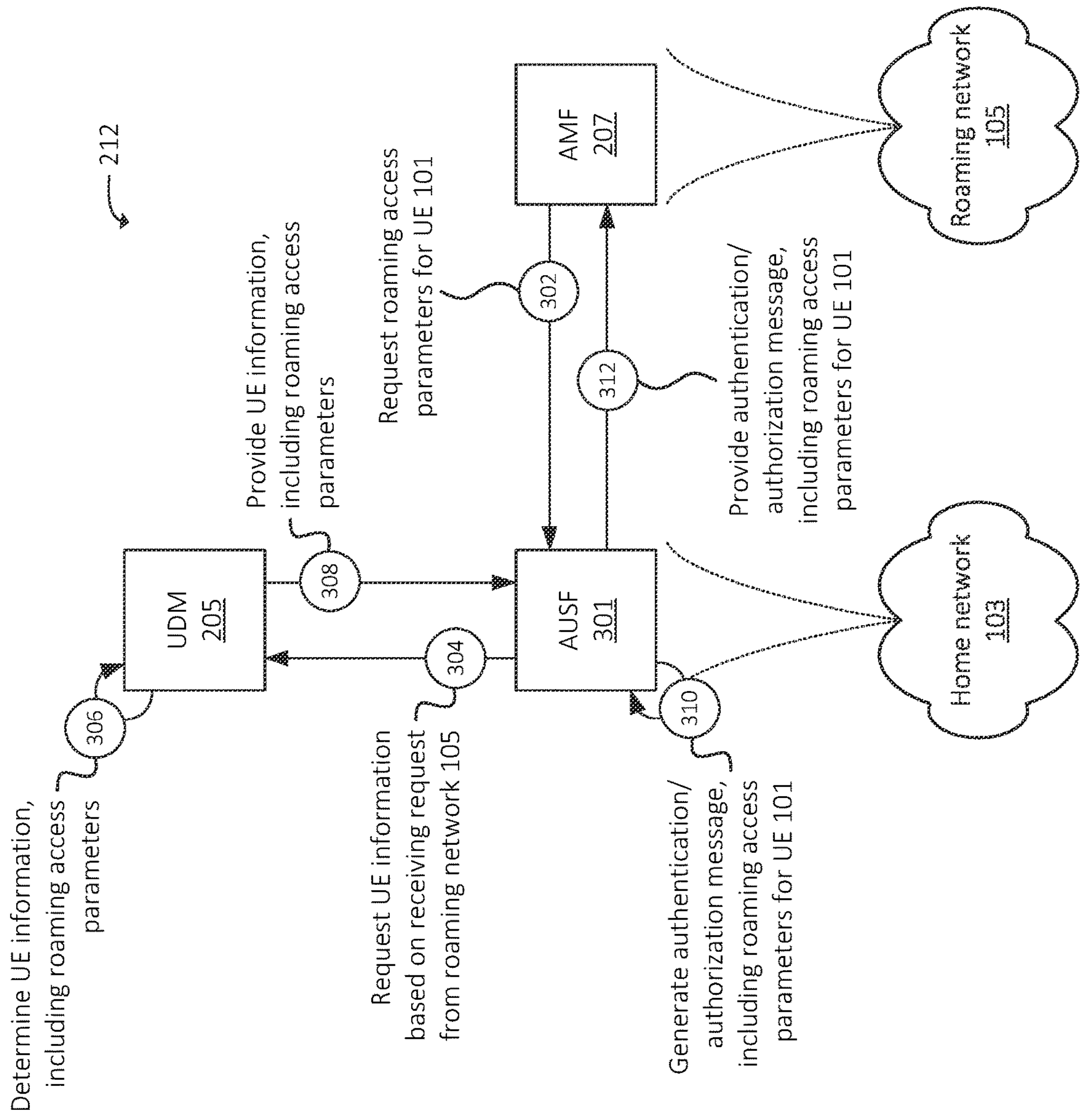

As described in more detail with respect to FIG. 3, AMF 207 may obtain (at 212) roaming access parameters for UE 101 from network 103. As discussed above, the roaming access parameters may include an indication of whether UE 101 is authorized to access network 105, and/or an indication of network slices or other parameters associated with access of UE 101 to network 105. As discussed above, the roaming access parameters may be provided in accordance with one or more authentication mechanisms implemented by network 103, based on which UE 101 may verify that the parameters were generated or provided by network 103 (e.g., without the risk of a "person-in-the-middle" attack or some other type of compromise or tampering). UE 101 and network 105 (e.g., AMF 207 and/or one or more other elements of network 105) may proceed to communicate in accordance with the roaming access parameters provided. For example, UE 101 may request the establishment of one or more communication sessions that are served by one or more network slices indicated in the roaming access parameters, and/or may request other suitable parameters as indicated in the roaming access parameters. Assuming network 105 maintains information indicating that UE 101 is authorized for such network slices or other parameters, the communication sessions may be established in accordance with the requested network slices or other parameters.

In some embodiments, the roaming access parameters may be received (at 212) from UDM 205 via an Authentication Server Function ("AUSF"), a UDR, or other suitable device or system that is communicatively coupled to AMF 207. For example, UDM 205 of network 103 may not, in some embodiments, be directly exposed to AMF 207 of network 105. As shown in FIG. 3, for example, AMF 207 may request (at 302) roaming access parameters for UE 101 from AUSF 301 of network 103, which may be communicatively coupled to, or exposed to, AMF 207 of network 105. In some embodiments, AUSF 301 of network 103 and AMF 207 may communicate via a Network Exposure Function ("NEF"), via AFs 201 and/or 203, and/or via some other suitable gateway or communication pathway. In some embodiments, AUSF 301 of network 103 and AMF 207 may communicate via a direct interface (e.g., via external or public Internet Protocol ("IP") addresses or other suitable identifiers). The request for roaming access parameters may include one or more identifiers of UE 101, such as an IMEI, an MDN, a SUPI, etc. In some embodiments, the request for roaming access parameters may include one or more authentication tokens or other authentication information provided by UE 101 when requesting a connection to network 105. AUSF 301 may request (at 304) UE information, associated with UE 101 (e.g., based on the provided one or more identifiers of UE 101) from UDM 205. In some embodiments, the request may indicate an identifier of network 105. In some common embodiments, the roaming access parameters may be pushed by UDM 205 and/or AUSF 301 of home network 103 to AMF 207 of roaming network 105.

UDM 205 may determine (at 306) UE information associated with UE 101, including roaming access parameters associated with network 105 and/or one or more other roaming networks. For example, in some embodiments, UDM 205 may provide only roaming information for network 105 (e.g., may exclude roaming information associated with one or more other networks), in scenarios where the request (at 304) specifies an identifier of network 105. On the other hand, in some embodiments, UDM 205 may provide roaming information for multiple networks.

UDM 205 and/or AUSF 301 may generate (at 310) an authentication and/or authorization message, including roaming access parameters for UE 101 accessing network 105. For example, AUSF 301 may verify, based on the information provided by UDM 205, that UE 101 is authorized to access network 105. Further, AUSF 301 may identify roaming access parameters associated with UE 101 accessing network 105, such as network slices of network 105 that UE 101 is authorized to access. For example, in situations where the response (at 308) from UDM 205 includes roaming information for multiple networks, AUSF 301 may select particular roaming information that is associated with network 105. In some embodiments, AUSF 301 may perform one or more other suitable operations, such as authenticating UE 101 (e.g., based on an authentication token or other suitable authentication information provided by UE 101 when requesting a connection to network 105).

As discussed above, the authentication and/or authorization information generated (at 310) by AUSF 301 may include one or more authentication tokens, digital signatures, etc. that may indicate that the roaming access parameters have been identified, determined, verified, etc. by AUSF 301. AUSF 301 may provide (at 312) the authentication and/or authorization information to AMF 207, which may forward some or all of such information to UE 101 (e.g., via an N1 interface, via Non-Access Stratum ("NAS") signaling, etc.). As discussed above, UE 101, AMF 207, and/or one or more other elements of network 105 may utilize such information to establish one or more communication sessions between UE 101 and network 105. For example, UE 101 may request a particular network slice or other parameters indicated in the provided roaming access parameters.

Figure 4:
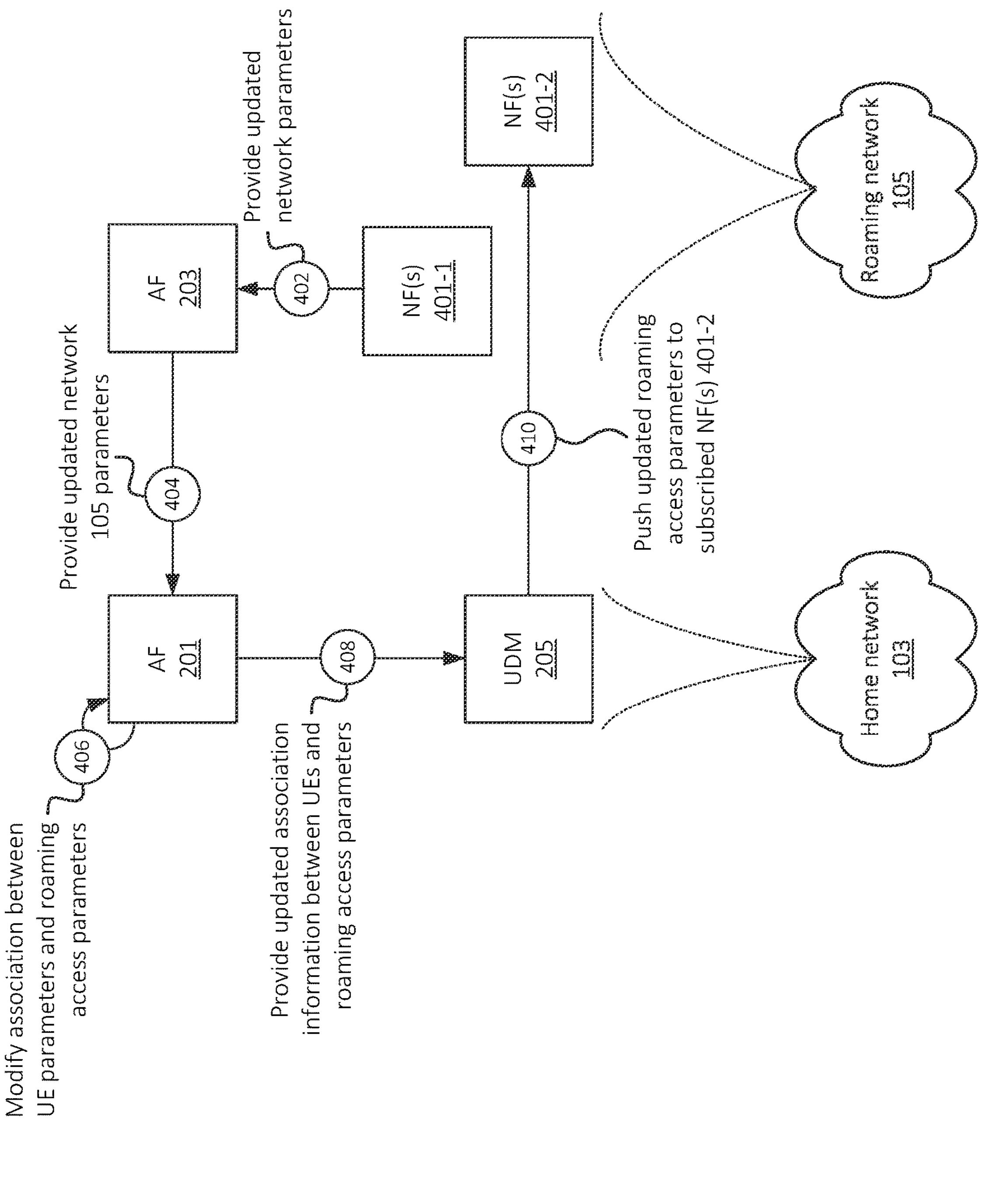

As shown in FIG. 4, roaming access parameters may be updated in real time or near-real time, and changes to such parameters may be dynamically implemented. For example, AF 203 may receive (at 402) an updated set of network parameters associated with network 105. For example, AF 203 may receive the updated network parameters from a particular NF (e.g., NF 401-1) of network 105 and/or from some other source. NF 401-1 may be, may include, may be communicatively coupled to, etc. a UDM of network 105, a Network Data Analytics Function ("NWDAF") of network 105, and/or other suitable NF. In some embodiments, in addition to or in lieu of receiving (at 402) updated network parameters, AF 203 may compute, calculate, or otherwise determine update network parameters (e.g., based on information received from NF 401-1 and/or some other source). For example, AF 203, NF 401-1, and/or some other device or system may utilize artificial intelligence/machine learning ("AI/ML") techniques, modeling techniques, predictive techniques, etc. to determine metrics (e.g., load metrics, performance metrics, etc.) associated with network 105, and may generate updated network parameters based on such techniques (e.g., based on predicting or determining a relatively high measure of load associated with one or more network slices of network 105, and/or other types of occurrences).

The updated network parameters may include, for example, different access policies for particular network slices than previously determined (e.g., network parameters previously determined or provided at 104). For example, the updated network parameters may indicate that additional, fewer, or different UEs are authorized to access particular network slices of network 105. As another example, the updated network parameters may indicate that different traffic or service types (e.g., voice calls, video streaming, gaming, etc.) are authorized to be served by different network slices than were previously authorized. In some embodiments, the updated network parameters may indicate a different level of capacity or availability for particular network slices of network 105 than were previously indicated (e.g., the updated network parameters may indicate that a particular network slice of network 105 is less available or has less capacity than was previously available).

AF 203 may provide (at 404) the updated network parameters to AF 201, which may accordingly modify (at 406) an association between UE parameters (e.g., associated with one or more UEs, such as UE 101) and roaming access parameters for use with network 105. For example, the modified association information may indicate that UE 101 is no longer authorized to access a particular network slice of network 105, may indicate that UE 101 is authorized to access an additional network slice of network 105, may indicate that UE 101 is authorized to receive different service or traffic types via network 105, etc.

Based on updating the association information between UE 101 and parameters of network 105, AF 201 may provide (at 408) the updated association information to UDM 205. For example, since information associated with UE 101 has changed, AF 201 may determine that such change should be propagated to UDM 205 and/or other elements of network 103. As noted above, the updated association information may indicate different network slices of network 105, or other parameters associated with accessing network 105, than was previously indicated (e.g., at 208) for UE 101.

UDM 205 may push (at 410) the updated roaming access parameters to one or more other devices or systems, such as NF 401-2. For example, NF 401-2 and/or other suitable devices or systems may have subscribed to UDM 205 for updates to UE 101, for updates to association information associated with one or more UEs and network 105, and/or may otherwise indicate that such updates should be provided by UDM 205. NF 401-2 may be, may include, may be communicatively coupled to, etc. AMF 207 of network 105, a Session Management Function ("SMF") of network 105, and/or some other suitable device or system that is authorized to access UDM 205 of network 103. In some embodiments, NF 401-2 may include or may be communicatively coupled to a NEF that is authorized to access UDM 205. In some embodiments, UDM 205 may push updated roaming access parameters, associated with UE 101 and network 105, to one or more other NFs of network 103 and/or of one or more other networks.

NF 401-2 may utilize the updated roaming access parameters to modify or control access of UE 101 to network 105, and/or for other suitable purposes. As one example, NF 401-2 may include, may be communicatively coupled to, etc. AMF 207. In situations where UE 101 is engaged in an active communication session (e.g., a PDU session associated with a particular network slice) which is no longer authorized, based on the updated roaming access parameters, AMF 207 may output a message to UE 101 instructing UE 101 to disconnect from the particular network slice, may output a message to UE 101 instructing UE 101 to connect to a different network slice that is authorized as per the updated roaming access parameters, and/or may perform other suitable operations. In some embodiments, NF 401-2 (e.g., AMF 207 and/or some other suitable device or system) may forward the updated roaming access parameters to UE 101, which may proactively modify one or more communication sessions based on the updated roaming access parameters (e.g., may request the de-establishment of a PDU session that is associated with a network slice that is no longer authorized, may request the modification of such PDU session to be associated with a different network slice that is authorized, etc.). In this manner, roaming access parameters may be modified in a dynamic manner, without requiring that UE 101 and network 105 participate in a new session establishment procedure in order to implement updated roaming access parameters.

Figure 5:
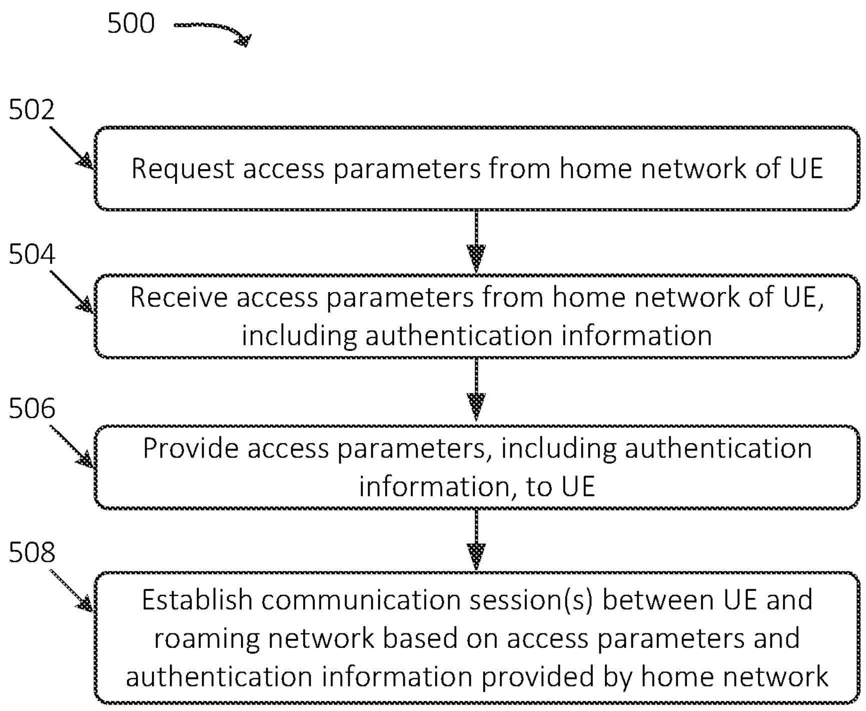
FIG. 5 illustrates an example process for providing roaming parameters, including home network authentication information, to a UE in order to facilitate communications between the UE and a roaming network, in accordance with some embodiments.

FIG. 5 illustrates an example process 500 for providing roaming parameters, including home network authentication information, to a UE in order to facilitate communications between the UE and a roaming network. In some embodiments, some or all of process 500 may be performed by one or more elements of particular network that is a roaming network with respect to a particular UE (e.g., network 105, which may be a roaming network to UE 101, as discussed above). For example, an access and/or mobility element of network 105, such as AMF 207, may perform some or all of process 500, potentially in concert with one or more other devices or systems.

Process 500 may further include requesting (at 502) access parameters, associated with a particular UE (e.g., UE 101), from a home network of the particular UE. For example, as discussed above, UE 101 may request access to network 105, which may be a roaming network with respect to UE 101. UE 101 may, for example, indicate a PLMN identifier or other suitable identifier of the home network of UE 101 (e.g., network 103, in the context of examples discussed above), based on which AMF 207 (and/or some other suitable device or system) may request access parameters (e.g., roaming access parameters) associated with UE 101 and network 105. The roaming access parameters may be associated with UE 101 and network 105, inasmuch as such parameters indicate a manner in which UE 101 is authorized to access network 105, such as network slices that UE 101 is authorized to be served by, types of traffic or services that UE 101 is authorized to send or receive via network 105, etc. In some embodiments, the access parameters may be requested from an authentication system of network 103, such as AUSF 301 or some other suitable element of network 103. In some embodiments, the access parameters may be requested via a NEF or some other suitable device, system, or communication pathway between networks 103 and 105.

Process 500 may additionally include receiving (at 504) the requested access parameters from the home network of UE 101. The requested access parameters may include authentication information generated or provided by the home network of UE 101 (e.g., network 103), such as one or more authentication tokens, cryptographic hash values, or other suitable information that may be used by UE 101 to verify that the provided access parameters have been generated, authorized, provided, etc. by the home network of UE 101, and that the access parameters have not been tampered with by other NFs or entities (e.g., in home network 103 or roaming network 105). In this sense, UE 101 may be able to verify that the parameters have not been subjected to a "person-in-the-middle" attack or other type of tampering, and thus that these parameters may be trusted and/or otherwise used.

Process 500 may also include providing (at 506) the access parameters, including the authentication information, to UE 101. For example, AMF 207 may provide the access parameters to UE 101 as part of, or pursuant to, a connection request from UE 101 (e.g., an attach request, a communication session establishment request, or other suitable type of request). As discussed above, UE 101 may verify the access parameters based on the authentication information. In some embodiments, UE 101 may select one or more of the provided access parameters, such as a particular network slice of network 105, after verifying the access parameters.

Process 500 may further include establishing (at 508) one or more communication sessions between UE 101 and the roaming network (e.g., network 105) based on the access parameters and authentication information provided by the home network (e.g., network 103). For example, UE 101 may request, from AMF 207 and/or some other element of network 105, the establishment of one or more PDU sessions associated with a particular network slice of network 105. AMF 207, an SMF, and/or one or more other elements of network 105 may verify that UE 101 is authorized to be served by such slice (e.g., based on information maintained in a UDR, UDM, etc. of network 105 and/or based on some other suitable authorization procedure), and may facilitate or establish the requested communications between UE 101 and network 105 in accordance with the requested access parameters.

In some embodiments, AUSF 301 of home network 103 may encrypt network slice parameters (e.g., NSSAI information, DNN information, etc.) that is associated with a different roaming network when sending the access parameters through roaming network 105 in order to maintain confidentiality and privacy of the other roaming network and the UE. The encryption may include an AES-256 or higher encryption technique, using a KAUSF as a master session key. In some embodiments, an Authenticated Encryption with Associated Data ("AEAD") technique (e.g., AES-GCM) and/or other suitable technique may be used.

Figure 6:
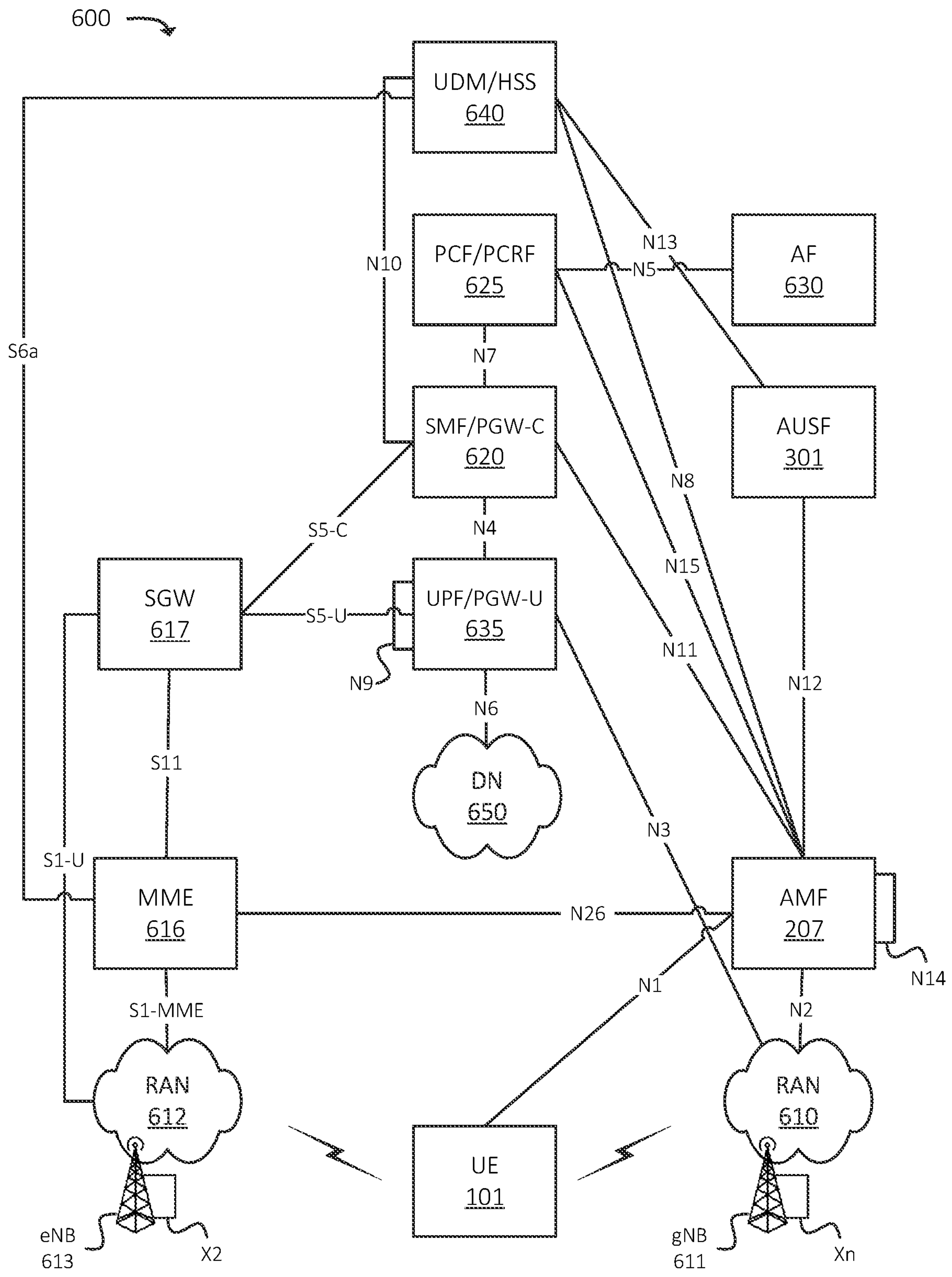
FIGS. 6 and 7 illustrate example environments in which one or more embodiments, described herein, may be implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 600 may represent or may include a 5G core ("5GC"). As shown, environment 600 may include UE 101, RAN 610 (which may include one or more Next Generation Node Bs ("gNBs") 611), RAN 612 (which may include one or more evolved Node Bs ("eNBs") 613), and various network functions such as AMF 207, Mobility Management Entity ("MME") 616, Serving Gateway ("SGW") 617, SMF/Packet Data Network ("PDN") Gateway ("PGW")-Control plane function ("PGW-C") 620, Policy Control Function ("PCF")/Policy Charging and Rules Function ("PCRF") 625, AF 630, User Plane Function ("UPF")/PGW-User plane function ("PGW-U") 635, UDM/Home Subscriber Server ("HSS") 640, and AUSF 301. Environment 600 may also include one or more networks, such as Data Network ("DN") 650. Environment 600 may include one or more additional devices or systems communicatively coupled to one or more networks (e.g., DN 650).

The example shown in FIG. 6 illustrates one instance of each network component or function (e.g., one instance of SMF/PGW-C 620, PCF/PCRF 625, UPF/PGW-U 635, UDM/HSS 640, and/or AUSF 301). In practice, environment 600 may include multiple instances of such components or functions. For example, in some embodiments, environment 600 may include multiple "slices" of a core network, where each slice includes a discrete and/or logical set of network functions (e.g., one slice may include a first instance of AMF 207, SMF/PGW-C 620, PCF/PCRF 625, and/or UPF/PGW-U 635, while another slice may include a second instance of AMF 207, SMF/PGW-C 620, PCF/PCRF 625, and/or UPF/PGW-U 635). The different slices may provide differentiated levels of service, such as service in accordance with different QoS parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. In some implementations, one or more devices of environment 600 may be physically integrated in, and/or may be physically attached to, one or more other devices of environment 600. Alternatively, or additionally, one or more of the devices of environment 600 may perform one or more network functions described as being performed by another one or more of the devices of environment 600.

Elements of environment 600 may interconnect with each other and/or other devices via wired connections, wireless connections, or a combination of wired and wireless connections. Examples of interfaces or communication pathways between the elements of environment 600, as shown in FIG. 6, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 6, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 600 may be, may include, may be implemented by, and/or may be communicatively coupled to network 103 and/or network 105.

UE 101 may include a computation and communication device, such as a wireless mobile communication device that is capable of communicating with RAN 610, RAN 612, and/or DN 650. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, an M2M device, or the like), a Fixed Wireless Access ("FWA") device, or another type of mobile computation and communication device. UE 101 may send traffic to and/or receive traffic (e.g., user plane traffic) from DN 650 via RAN 610, RAN 612, and/or UPF/PGW-U 635.

RAN 610 may be, or may include, a 5G RAN that includes one or more base stations (e.g., one or more gNBs 611), via which UE 101 may communicate with one or more other elements of environment 600. UE 101 may communicate with RAN 610 via an air interface (e.g., as provided by gNB 611). For instance, RAN 610 may receive traffic (e.g., user plane traffic such as voice call traffic, data traffic, messaging traffic, etc.) from UE 101 via the air interface, and may communicate the traffic to UPF/PGW-U 635 and/or one or more other devices or networks. Further, RAN 610 may receive signaling traffic, control plane traffic, etc. from UE 101 via the air interface, and may communicate such signaling traffic, control plane traffic, etc. to AMF 207 and/or one or more other devices or networks. Additionally, RAN 610 may receive traffic intended for UE 101 (e.g., from UPF/PGW-U 635, AMF 207, and/or one or more other devices or networks) and may communicate the traffic to UE 101 via the air interface.

RAN 612 may be, or may include, a LTE RAN that includes one or more base stations (e.g., one or more eNBs 613), via which UE 101 may communicate with one or more other elements of environment 600. UE 101 may communicate with RAN 612 via an air interface (e.g., as provided by eNB 613). For instance, RAN 612 may receive traffic (e.g., user plane traffic such as voice call traffic, data traffic, messaging traffic, signaling traffic, etc.) from UE 101 via the air interface, and may communicate the traffic to UPF/PGW-U 635 (e.g., via SGW 617) and/or one or more other devices or networks. Further, RAN 612 may receive signaling traffic, control plane traffic, etc. from UE 101 via the air interface, and may communicate such signaling traffic, control plane traffic, etc. to MME 616 and/or one or more other devices or networks. Additionally, RAN 612 may receive traffic intended for UE 101 (e.g., from UPF/PGW-U 635, MME 616, SGW 617, and/or one or more other devices or networks) and may communicate the traffic to UE 101 via the air interface.

AMF 207 may include one or more devices, systems, Virtualized Network Functions ("VNFs"), Cloud-Native Network Functions ("CNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 610 and/or gNBs 611, and/or to perform other operations. In some embodiments, the 5G network may include multiple AMFs 207, which communicate with each other via the N14 interface (denoted in FIG. 6 by the line marked "N14" originating and terminating at AMF 207).

MME 616 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 612 and/or eNBs 613, and/or to perform other operations.

SGW 617 may include one or more devices, systems, VNFs, CNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, CNFs, etc., that gather, process, store, and/or provide information in a manner described herein. SMF/PGW-C 620 may, for example, facilitate the establishment of communication sessions on behalf of UE 101. In some embodiments, the establishment of communications sessions may be performed in accordance with one or more policies provided by PCF/PCRF 625.

PCF/PCRF 625 may include one or more devices, systems, VNFs, CNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 (e.g., which may implement, may include, may be communicatively coupled to, etc. AF 201 and/or AF 203) may include one or more devices, systems, VNFs, CNFs, etc., that receive, store, and/or provide information that may be used in determining parameters (e.g., quality of service parameters, charging parameters, or the like) for certain applications. As discussed above, AF 630 may determine roaming access parameters associated with one or more UEs, may communicate with one or more other elements of environment 600 (e.g., to obtain UE information, provide roaming access parameters, etc.), and/or may perform other operations described herein.

UPF/PGW-U 635 may include one or more devices, systems, VNFs, CNFs, etc., that receive, store, and/or provide data (e.g., user plane data). For example, UPF/PGW-U 635 may receive user plane data (e.g., voice call traffic, data traffic, etc.), destined for UE 101, from DN 650, and may forward the user plane data toward UE 101 (e.g., via RAN 610, SMF/PGW-C 620, and/or one or more other devices). In some embodiments, multiple instances of UPF/PGW-U 635 may be deployed (e.g., in different geographical locations), and the delivery of content to UE 101 may be coordinated via the N9 interface (e.g., as denoted in FIG. 6 by the line marked "N9" originating and terminating at UPF/PGW-U 635). Similarly, UPF/PGW-U 635 may receive traffic from UE 101 (e.g., via RAN 610, RAN 612, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

UDM/HSS 640 and AUSF 301 may include one or more devices, systems, VNFs, CNFs, etc., that manage, update, and/or store, in one or more memory devices associated with AUSF 301 and/or UDM/HSS 640, profile information associated with a subscriber. AUSF 301 and/or UDM/HSS 640 may perform authentication, authorization, and/or accounting operations associated with the subscriber and/or a communication session with UE 101.

DN 650 may include one or more wired and/or wireless networks. For example, DN 650 may include an IP-based PDN, a wide area network ("WAN") such as the Internet, a private enterprise network, and/or one or more other networks. UE 101 may communicate, through DN 650, with data servers, other UEs 101, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 101 may communicate.

Figure 7:
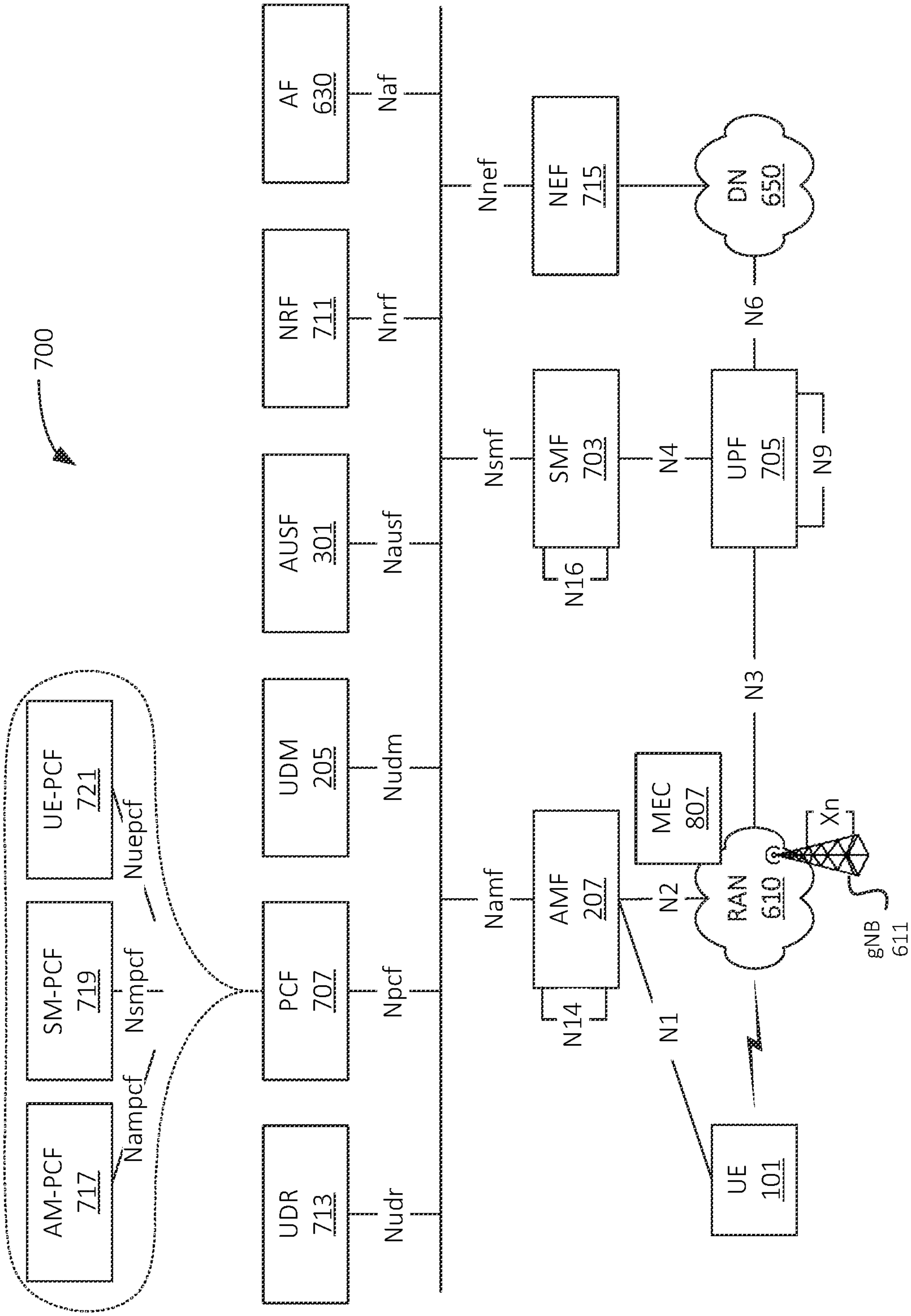

FIG. 7 illustrates another example environment 700, in which one or more embodiments may be implemented. In some embodiments, environment 700 may correspond to a 5G network, and/or may include elements of a 5G network. In some embodiments, environment 700 may correspond to a 5G SA architecture. In some embodiments, environment 700 may include a 5GC, in which 5GC network elements perform one or more operations described herein.

As shown, environment 700 may include UE 101, RAN 610 (which may include one or more gNBs 611 or other types of wireless network infrastructure) and various network functions, which may be implemented as VNFs, CNFs, etc. Such network functions may include AMF 207. SMF 703, UPF 705, PCF 707, UDM 205, AUSF 301, Network Repository Function ("NRF") 711, AF 630, Unified Data Repository ("UDR") 713, and NEF 715. Environment 700 may also include or may be communicatively coupled to one or more networks, such as Data Network DN 650.

The example shown in FIG. 7 illustrates one instance of each network component or function (e.g., one instance of SMF 703, UPF 705, PCF 707, UDM 205, AUSF 301, etc.). In practice, environment 700 may include multiple instances of such components or functions. For example, in some embodiments, environment 700 may include multiple "slices" of a core network, where each slice includes a discrete and/or logical set of network functions (e.g., one slice may include a first instance of SMF 703, PCF 707, UPF 705, etc., while another slice may include a second instance of SMF 703, PCF 707, UPF 705, etc.). Additionally, or alternatively, one or more of the network functions of environment 700 may implement multiple network slices. The different slices may provide differentiated levels of service, such as service in accordance with different QoS parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. In some implementations, one or more devices of environment 700 may be physically integrated in, and/or may be physically attached to, one or more other devices of environment 700. Alternatively, or additionally, one or more of the devices of environment 700 may perform one or more network functions described as being performed by another one or more of the devices of environment 700.

Elements of environment 700 may interconnect with each other and/or other devices via wired connections, wireless connections, or a combination of wired and wireless connections. Examples of interfaces or communication pathways between the elements of environment 700, as shown in FIG. 7, may include interfaces shown in FIG. 7 and/or one or more interfaces not explicitly shown in FIG. 7. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 700 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 207), an Nudm interface (e.g., indicating communications to be routed to UDM 205), an Npcf interface, an Nupf interface, an Nnef interface, an Nsmf interface, an Nnrf interface, an Nudr interface, an Naf interface, and/or one or more other SBIs. In some embodiments, environment 700 may be, may include, may be implemented by, and/or may be communicatively coupled to network 103 and/or network 105.

UPF 705 may include one or more devices, systems, VNFs, CNFs, etc., that receive, route, process, and/or forward traffic (e.g., user plane traffic). As discussed above, UPF 705 may communicate with UE 101 via one or more communication sessions, such as PDU sessions. Such PDU sessions may be associated with a particular network slice or other suitable QoS parameters, as noted above. UPF 705 may receive downlink user plane traffic (e.g., voice call traffic, data traffic, etc. destined for UE 101) from DN 650, and may forward the downlink user plane traffic toward UE 101 (e.g., via RAN 610). In some embodiments, multiple UPFs 705 may be deployed (e.g., in different geographical locations), and the delivery of content to UE 101 may be coordinated via the N9 interface. Similarly, UPF 705 may receive uplink traffic from UE 101 (e.g., via RAN 610), and may forward the traffic toward DN 650. In some embodiments, UPF 705 may implement, may be implemented by, may be communicatively coupled to, and/or may otherwise be associated with UPF/PGW-U 635. In some embodiments, UPF 705 may communicate (e.g., via the N4 interface) with SMF 703, regarding user plane data processed by UPF 705 (e.g., to provide analytics or reporting information, to receive policy and/or authorization information, etc.).

PCF 707 may include one or more devices, systems, VNFs, CNFs, etc., that aggregate, derive, generate, etc. policy information associated with the 5GC and/or UEs 101 that communicate via the 5GC and/or RAN 610. PCF 707 may receive information regarding policies and/or subscriptions from one or more sources, such as subscriber databases (e.g., UDM 205, UDR 713, etc.), and/or from one or more users such as, for example, an administrator associated with PCF 707. In some embodiments, the functionality of PCF 707 may be split into multiple network functions or subsystems, such as access and mobility PCF ("AM-PCF") 717, session management PCF ("SM-PCF") 719, UE PCF ("UE-PCF") 721, and so on. Such different "split" PCFs may be associated with respective SBIs (e.g., AM-PCF 717 may be associated with an Nampcf SBI, SM-PCF 719 may be associated with an Nsmpcf SBI, UE-PCF 721 may be associated with an Nuepcf SBI, and so on) via which other network functions may communicate with the split PCFs. The split PCFs may maintain information regarding policies associated with different devices, systems, and/or network functions.

NRF 711 may include one or more devices, systems, VNFs, CNFs, etc. that maintain routing and/or network topology information associated with the 5GC. For example, NRF 711 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 713 may include one or more devices, systems, VNFs, CNFs, etc. that provide user and/or subscriber information, based on which PCF 707 and/or other elements of environment 700 may determine access policies, QoS policies, charging policies, or the like. In some embodiments, UDR 713 may receive such information from UDM 205 and/or one or more other sources.

NEF 715 include one or more devices, systems, VNFs, CNFs, etc. that provide access to information, application programming interfaces ("APIs"), and/or other operations or mechanisms of the 5GC to devices or systems that are external to the 5GC. NEF 715 may maintain authorization and/or authentication information associated with such external devices or systems, such that NEF 715 is able to provide information, that is authorized to be provided, to the external devices or systems. Such information may be received from other network functions of the 5GC (e.g., as authorized by an administrator or other suitable entity associated with the 5GC), such as SMF 703, UPF 705, a charging function ("CHF") of the 5GC, and/or other suitable network function. NEF 715 may communicate with external devices or systems via DN 650 and/or other suitable communication pathways.

While environment 700 is described in the context of a 5GC, as noted above, environment 700 may, in some embodiments, include or implement one or more other types of core networks. For example, in some embodiments, environment 700 may be or may include a converged packet core, in which one or more elements may perform some or all of the functionality of one or more 5GC network functions and/or one or more EPC network functions. For example, in some embodiments, AMF 207 may include, may implement, may be implemented by, and/or may otherwise be associated with MME 616; SMF 703 may include, may implement, may be implemented by, and/or may otherwise be associated with SGW 617; PCF 707 may include, may implement, may be implemented by, and/or may otherwise be associated with a PCRF; NEF 715 may include, may implement, may be implemented by, and/or may otherwise be associated with a Service Capability Exposure Function ("SCEF"); and so on.

Figure 8:
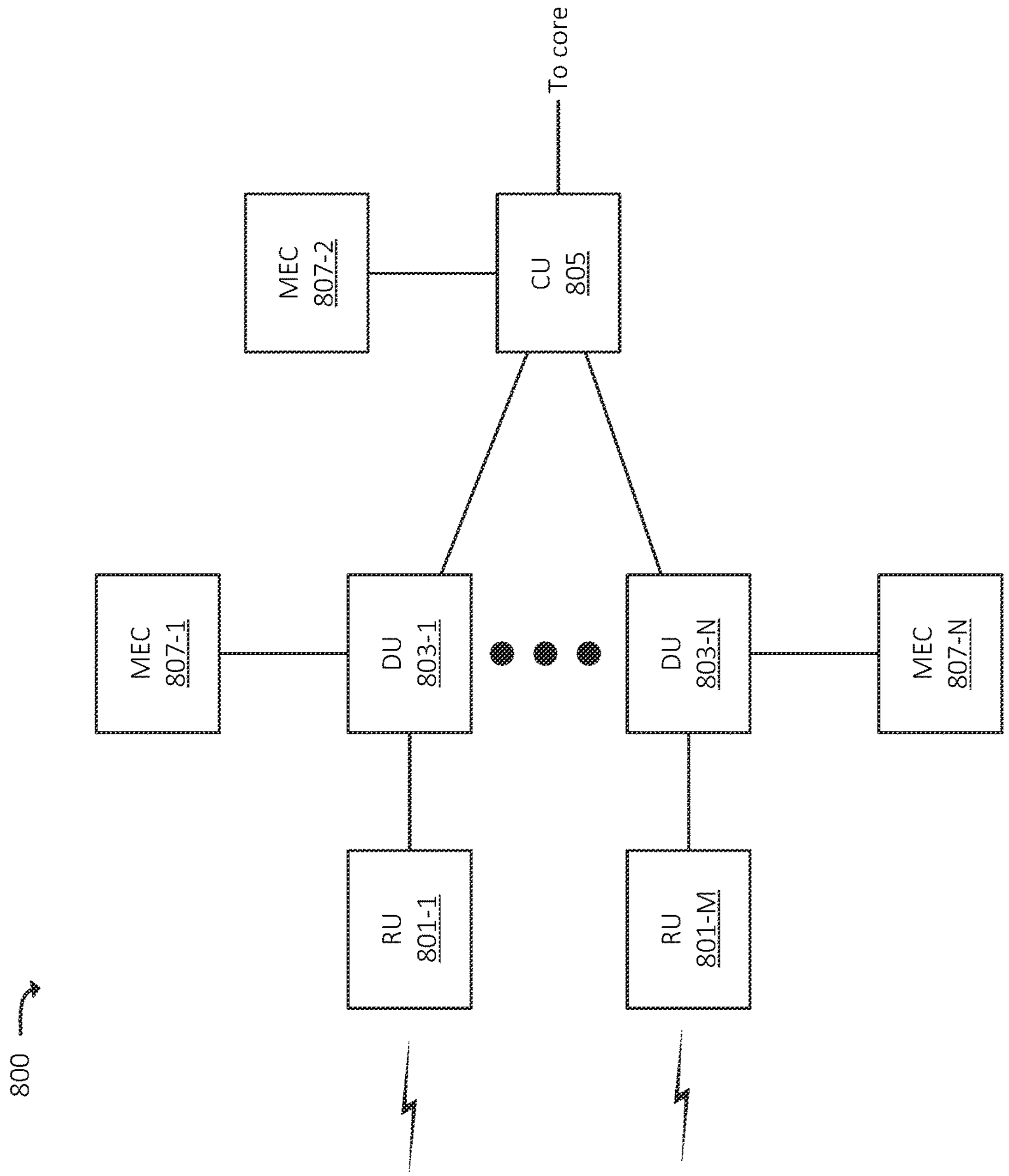
FIG. 8 illustrates an example arrangement of a radio access network ("RAN"), in accordance with some embodiments.

FIG. 8 illustrates an example RAN environment 800, which may be included in and/or implemented by one or more RANs (e.g., RAN 610 or some other RAN). In some embodiments, a particular RAN 610 may include one RAN environment 800. In some embodiments, a particular RAN 610 may include multiple RAN environments 800. In some embodiments, RAN environment 800 may correspond to a particular gNB 611 of RAN 610. In some embodiments, RAN environment 800 may correspond to multiple gNBs 611. In some embodiments, RAN environment 800 may correspond to one or more other types of base stations of one or more other types of RANs. As shown, RAN environment 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 207 and/or UPF 705). In the uplink direction (e.g., for traffic from UEs 101 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 101, and may determine which DU(s) 803 should receive the downlink traffic. DU 803 may include one or more devices that transmit traffic between a core network (e.g., via CU 805) and UE 101 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 101.

RU 801 may include hardware circuitry (e.g., one or more RF transceivers, antennas, radios, and/or other suitable hardware) to communicate wirelessly (e.g., via an RF interface) with one or more UEs 101, one or more other DUs 803 (e.g., via RUs 801 associated with DUs 803), and/or any other suitable type of device. In the uplink direction, RU 801 may receive traffic from UE 101 and/or another DU 803 via the RF interface and may provide the traffic to DU 803. In the downlink direction, RU 801 may receive traffic from DU 803, and may provide the traffic to UE 101 and/or another DU 803.

One or more elements of RAN environment 800 may, in some embodiments, be communicatively coupled to one or more Multi-Access/Mobile Edge Computing ("MEC") devices, referred to sometimes herein simply as a "MECs," 807. For example, DU 803-1 may be communicatively coupled to MEC 807-1, DU 803-N may be communicatively coupled to MEC 807-N, CU 805 may be communicatively coupled to MEC 807-2, and so on. MECs 807 may include hardware resources (e.g., configurable or provisionable hardware resources) that may be configured to provide services and/or otherwise process traffic to and/or from UE 101, via a respective RU 801.

For example, DU 803-1 may route some traffic, from UE 101, to MEC 807-1 instead of to a core network via CU 805. MEC 807-1 may process the traffic, perform one or more computations based on the received traffic, and may provide traffic to UE 101 via RU 801-1. In some embodiments, MEC 807 may include, and/or may implement, some or all of the functionality described above with respect to UPF 705, AF 630, and/or one or more other devices, systems, VNFs, CNFs, etc. In this manner, ultra-low latency services may be provided to UE 101, as traffic does not need to traverse DU 803, CU 805, links between DU 803 and CU 805, and an intervening backhaul network between RAN environment 800 and the core network.

Figure 9:
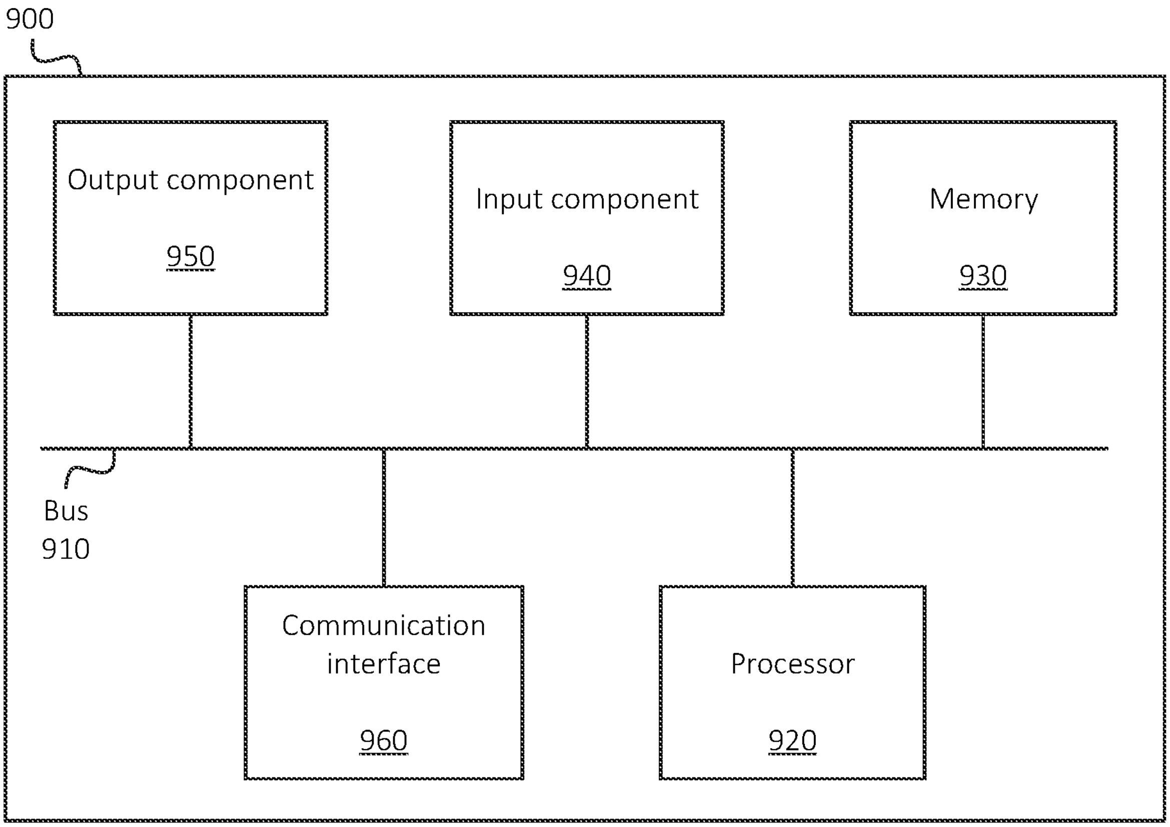
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions (e.g., processor-executable instructions). In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or other receives or detects input from a source external to input component 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing instructions, such as software instructions, processor-executable instructions, etc. stored in a computer-readable medium, such as memory 930. A computer-readable medium may be defined as a non-transitory memory device. A memory device may include space within a single physical memory device or spread across multiple physical memory devices. The instructions may be read into memory 930 from another computer-readable medium or from another device. The instructions stored in memory 930 may be processor-executable instructions that cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one." "single," "only." or similar language is used. Further, the phrase "based on" is intended to mean "based, at least in part, on" unless explicitly stated otherwise.

What is claimed is:

1. A device, comprising:

one or more processors configured to:

receive, from a particular User Equipment ("UE") registered with a first network as a home network of the particular UE, a request to access a second network that is a roaming network with respect to the particular UE, wherein the request includes a network identifier associated with the first network;

subscribe to an element of the first network, based on the network identifier included in the request, for access parameters associated with the particular UE and the second network;

receive, from the element of the first network and based on the subscribing, a first set of access parameters associated with access by the particular UE to the second network, wherein the first set of access parameters are provided by the first network with authentication information associated with the first network;

output the first set of access parameters and the authentication information to the particular UE, wherein the particular UE:

verifies the first set of access parameters based on the authentication information, selects one or more access parameters of the verified first set of access parameters, and requests a communication session establishment with the second network in accordance with the selected one or more access parameters of the verified first set of access parameters;

receive, from the first network and after receiving the first set of access parameters, a second set of access parameters associated with the particular UE, wherein the first network updates UE information, maintained by the first network, to indicate that the particular UE is associated with the second set of access parameters when connected to the second network, and wherein the element of the first network further automatically pushes the second set of access parameters to the second network based on the subscribing; and modify access, of the particular UE, to the second network based on the second set of access parameters.

2. The device of claim 1, wherein the request includes a request to communicate via a radio access network ("RAN") of the second network, wherein the subscribing is performed based on identifying the request to communicate via the RAN of the second network.

3. The device of claim 1, wherein the network identifier associated with the first network is a first network identifier, and wherein the second network is associated with a different second network identifier.

4. The device of claim 3, wherein the first network identifier includes a first Public Land Mobile Network ("PLMN") identifier, and wherein the second network identifier includes a second PLMN identifier.

5. The device of claim 1, wherein the authentication information is provided by an Authentication Server Function ("AUSF") of the first network.

6. The device of claim 1, wherein the first set of access parameters indicate one or more network slices, of the second network, that the particular UE is authorized to access, wherein the selection of the one or more access parameters the particular UE includes selecting a particular network slice of the one or more network slices.

7. The device of claim 6, wherein the communication session establishment request in accordance with the selected one or more access parameters includes a protocol data unit ("PDU") session establishment request that indicates the selected particular network slice.

8. A non-transitory computer-readable storage medium, storing a plurality of processor-executable instructions to:

receive, from a particular User Equipment ("UE") registered with a first network as a home network of the particular UE, a request to access a second network that is a roaming network with respect to the particular UE, wherein the request includes a network identifier associated with the first network;

subscribe to an element of the first network, based on the network identifier included in the request, for access parameters associated with the particular UE and the second network;

receive, from the element of the first network and based on the subscribing, a first set of access parameters associated with access by the particular UE to the second network, wherein the first set of access parameters are provided by the first network with authentication information associated with the first network;

output the first set of access parameters and the authentication information to the particular UE, wherein the particular UE:

verifies the first set of access parameters based on the authentication information, selects one or more access parameters of the verified first set of access parameters, and requests a communication session establishment with the second network in accordance with the selected one or more access parameters of the verified first set of access parameters;

receive, from the first network and after receiving the first set of access parameters, a second set of access parameters associated with the particular UE, wherein the first network updates UE information, maintained by the first network, to indicate that the particular UE is associated with the second set of access parameters when connected to the second network, and wherein the element of the first network further automatically pushes the second set of access parameters to the second network based on the subscribing; and modify access, of the particular UE, to the second network based on the second set of access parameters.

9. The non-transitory computer-readable storage medium of claim 8, wherein the request includes a request to communicate via a radio access network ("RAN") of the second network, wherein the subscribing is performed based on identifying the request to communicate via the RAN of the second network.

10. The non-transitory computer-readable storage medium of claim 8, wherein the network identifier associated with the first network is a first network identifier, and wherein the second network is associated with a different second network identifier.

11. The non-transitory computer-readable storage medium of claim 10, wherein the first network identifier includes a first Public Land Mobile Network ("PLMN") identifier, and wherein the second network identifier includes a second PLMN identifier.

12. The non-transitory computer-readable storage medium of claim 8, wherein the authentication information is provided by an Authentication Server Function ("AUSF") of the first network.

13. The non-transitory computer-readable storage medium of claim 8, wherein the first set of access parameters indicate one or more network slices, of the second network, that the particular UE is authorized to access, wherein the selection of the one or more access parameters by the particular UE includes selecting a particular network slice of the one or more network slices.

14. The non-transitory computer-readable storage medium of claim 13, wherein the communication session establishment request in accordance with the selected one or more access parameters includes a protocol data unit ("PDU") session establishment request that indicates the selected particular network slice.

15. A method performed by a device, the method comprising:

receiving, from a particular User Equipment ("UE") registered with a first network as a home network of the particular UE, a request to access a second network that is a roaming network with respect to the particular UE, wherein the request includes a network identifier associated with the first network;

subscribing to an element of the first network, based on the network identifier included in the request, for access parameters associated with the particular UE and the second network;

receiving, from the element of the first network and based on the subscribing, a first set of access parameters associated with access by the particular UE to the second network, wherein the first set of access parameters are provided by the first network with authentication information associated with the first network;

outputting the first set of access parameters and the authentication information to the particular UE, wherein the particular UE:

verifies the first set of access parameters based on the authentication information, selects one or more access parameters of the verified first set of access parameters, and requests a communication session establishment with the second network in accordance with the selected one or more access parameters of the verified first set of access parameters;

receiving, from the first network and after receiving the first set of access parameters, a second set of access parameters associated with the particular UE, wherein the first network updates UE information, maintained by the first network, to indicate that the particular UE is associated with the second set of access parameters when connected to the second network, and wherein the element of the first network further automatically pushes the second set of access parameters to the second network based on the subscribing; and modifying access, of the particular UE, to the second network based on the second set of access parameters.

16. The method of claim 15, wherein the request includes a request to communicate via a radio access network ("RAN") of the second network, wherein the subscribing is performed based on identifying the request to communicate via the RAN of the second network.

17. The method of claim 15, wherein the first network is associated with a first Public Land Mobile Network ("PLMN") identifier, and wherein the second network is associated with a second PLMN identifier.

18. The method of claim 15, wherein the authentication information is provided by an Authentication Server Function ("AUSF") of the first network.

19. The method of claim 15, wherein the first set of access parameters indicate one or more network slices, of the second network, that the particular UE is authorized to access, wherein the selection of the one or more access parameters by the particular UE includes selecting a particular network slice of the one or more network slices.

20. The method of claim 19, wherein the communication session establishment request in accordance with the selected one or more access parameters includes a protocol data unit ("PDU") session establishment request that indicates the selected particular network slice.

* * * * *